United States Patent [19]

Kuromatsu

[11] 4,448,656
[45] May 15, 1984

[54] ELECTROLYTIC/ELECTRIC DISCHARGE MACHINING OF A NON-CONDUCTIVE WORKPIECE

[75] Inventor: Akio Kuromatsu, Yokohama, Japan

[73] Assignee: Ohyo Jiki Labolatory Company Ltd., Kawagawa, Japan

[21] Appl. No.: 390,851

[22] Filed: Jun. 22, 1982

[30] Foreign Application Priority Data

Jun. 24, 1981 [JP] Japan ................................. 56-96631
May 8, 1982 [JP] Japan ................................. 57-75986

[51] Int. Cl.³ .......................... B23P 1/10; B23P 1/12; B23K 9/16
[52] U.S. Cl. ........................... 204/129.4; 204/129.46; 204/217; 204/DIG. 9; 204/292; 204/293; 204/290 R; 219/68; 219/69 E; 219/69 M; 219/69 V
[58] Field of Search ................ 204/129.4, 129.46, 217, 204/292, 293, 291, DIG. 10, DIG. 9, 290 R; 219/69 V, 69 M, 69 E, 68

[56] References Cited

U.S. PATENT DOCUMENTS 4,013,526  3/1977  Inoue ............................ 204/129.46
4,140,598  2/1979  Kimoto et al. ............. 204/129.46 X
4,243,862  1/1981  Wetzels ................................. 219/68

FOREIGN PATENT DOCUMENTS 1601363  9/1970  France ............................ 204/129.46
 645808  2/1979  U.S.S.R. ......................... 204/129.46

Primary Examiner—Donald R. Valentine
Attorney, Agent, or Firm—Armstrong, Nikaido, Marmelstein & Kubovcik

[57] ABSTRACT

The electrolytic/electric discharge machining of a workpiece of a non-conductive hard material, for example, ceramic material is carried out by preparing a grinding wheel having conductive regions and non-conductive abrasive regions circumferentially alternately arranged on the circumferential edge of the wheel, and bringing the rotating grinding wheel in contact with the workpiece while applying AC or DC voltage across the grinding wheel and the non-conductive workpiece.

9 Claims, 1 Drawing Figure

U.S. Patent May 15, 1984 4,448,656
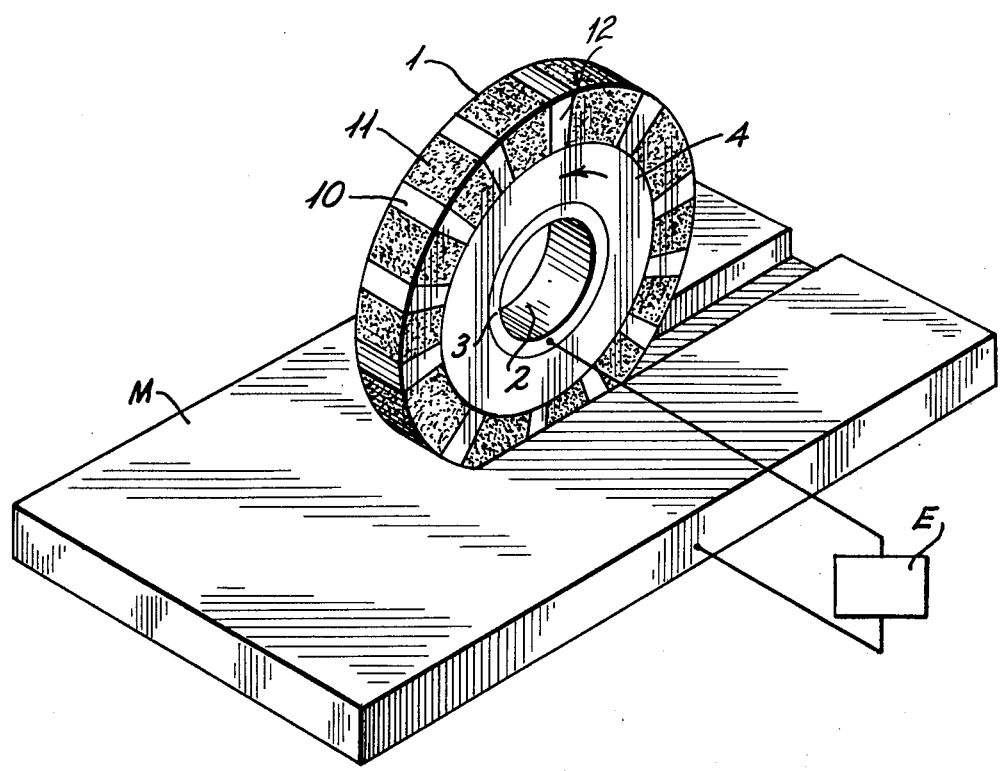

ELECTROLYTIC/ELECTRIC DISCHARGE MACHINING OF A NON-CONDUCTIVE WORKPIECE

BACKGROUND OF THE INVENTION

This invention relates to the electrolytic and electric discharge machining or grinding of a non-conductive workpiece using a grinding wheel having conductive regions.

In recent years, a number of improved materials were newly developed as well as methods for grinding and cutting such materials. The most promising for the machining of hard materials such as super hard alloys is electric discharge grinding.

The discharge grinding, however, is not applicable to the machining of non-conductive hard materials, for example, ceramics, glass, quartz, and sapphire because it depends on electrical conduction. Thus, the discharge grinding has limited applications.

SUMMARY OF THE INVENTION

An object of this invention is to provide an electrolytic/discharge machining method capable of precisely machining a non-conductive hard material within a short time.

According to this invention, there is provided a method for the electrolytic/electric discharge machining of a non-conductive workpiece, comprising preparing a grinding wheel having conductive regions and non-conductive abrasive regions circumferentially alternately arranged at least on the circumferential edge of the wheel, placing a non-conductive workpiece beneath the surface of an electrolyte, and bringing the rotating grinding wheel in contact with the non-conductive workpiece while applying AC or DC voltage between the conductive regions of said grinding wheel and said non-conductive workpiece.

BRIEF DESCRIPTION OF THE DRAWING

The above and other objects, features and advantages of this invention will be more clearly understood from the following description taken in conjunction with the accompanying drawing, in which FIG. 1 is a perspective view showing a grinding wheel in contact with a workpiece.

DESCRIPTION OF THE PREFERRED EMBODIMENT

Referring to FIG. 1, there is shown a grinding wheel 1 as comprising a cylindrical conductive hub 3 with a central opening 2 through which a rotating shaft (not shown) is inserted, a doughnut-shaped disc or current collector 4 encircling the hub 3, and an annular bonded abrasive body encircling the disc. The hub 3 and the disc 4 may preferably be made of a well-known conductive metal. Alternatively, the disc 4 may comprise a base material having a thin metal sheet attached to the side surface.

The annular abrasive body is a sintered body of abrasive grains, for example, green carborundum, white alundum, pink alundum, silica, CBN (cubic boron nitride) and diamond grains bonded in a binder. Such a sintered abrasive body is commercially available. The abrasive grains forming the grinding wheel body may be of any desired material other than the above-described materials as long as it has improved insulating and abrasive properties.

The annular abrasive body of the grinding wheel is provided with a plurality of transverse channels in the circumferential edge and with a corresponding plurality of radial channels at least in one side surface. The radial channels extend from the transverse channels in the edge to the current collector 4. These channels may be formed at equal or unequal spacings. These channels are filled with a conductive material, for example, an alloy of silver, copper or nickel to form conductive regions 10 and current carrying paths 12 electrically connecting the conductive regions 10 to the current collector 4. The remaining regions of the annular abrasive body which are spaced apart by the conductive regions 10 provide non-conductive abrasive regions 11.

As described above, the grinding wheel which may be used in this invention has conductive regions 10 and non-conductive abrasive regions 11 circumferentially alternately arranged at least on the circumferential edge of the wheel.

A grinding wheel comprising circumferentially alternately arranged conductive segments and non-conductive abrasive segments may also be used although the abovementioned grinding wheel composed of an annular abrasive body having a plurality of conductive strips embedded is preferred because of economy and easiness of fabrication.

In a further embodiment, the grinding wheel having alternately arranged conductive and non-conductive regions may also be manufactured by preparing a conductive grinding wheel and forming a plurality of spaced non-conductive abrasive regions in the wheel.

AC or DC voltage is applied between the grinding wheel 1 and a workpiece M. The feature of this invention is to apply AC or DC voltage between the grinding wheel 1 having alternately arranged conductive and non-conductive regions and the non-conductive workpiece M.

The method of this invention may be carried out as follows. A source E for AC or DC voltage is electrically connected to the grinding wheel 1 via the conductive hub 3 and to the non-conductive workpiece M, which is placed in an electrolytic solution, for example, 1–2% of $NaNO_3$, $NaCl$ and $KNO_3$ in water. The grinding wheel 1 is rotated at a high speed and brought into contact with the workpiece M. More specifically, the discharging regions and the non-discharging regions alternately come in contact with the workpiece M with a minute difference in time.

In the case of AC voltage, the voltage source E functions to apply voltage of an alternating current waveform to impart resonance to the non-conductive workpiece. As a result, a conductive state due to induction is developed between one conductive region 10 embedded in the circumferential edge of the grinding wheel 1 and the non-conductive workpiece M, thereby causing the workpiece M to melt under the action of electric discharge. As the adjacent abrasive region 11 then comes in contact with the workpiece M, mechanical grinding by grains in the abrasive region 11 takes place. As the grinding wheel 1 rotates, the discharge or melting and the mechanical grinding are alternately repeated in an instant so that a molten material is instantaneously and mechanically taken away, ensuring highly efficient grinding.

In the case of DC voltage, as the discharging regions and the non-discharging regions alternately come in contact with the workpiece with a minute difference in time, discontinuous pulse waves are applied to the workpiece M so that an induction effect takes place in the non-conductive workpiece. This allows discharge to occur even though the workpiece M is non-conductive. Electrolytic discharging takes place in a pulsating current mode. This pulsating electrolytic discharge causes the adjacent portion of the workpiece M to melt. By varying the pulse width, the maximum DC voltage suitable for the electrolysis of the workpiece M can be determined. The pulse width may be determined in terms of (a) a variation of the rotation speed of the grinding wheel 1, (b) the width of the discharging or conductive regions 10 of the grinding wheel, and (c) the spacing between the adjoining discharging or conductive regions 10. The following conditions have been proved to be acceptable through a series of experiments.

Voltage: 5-100 volts
Current: 0.1-10 amperes
Pulse: 50-5,000 hertz

After a surface portion of the workpiece M has been slightly melted through the contact with one discharging region 10, the non-conductive abrasive region 11 then passes across this molten surface portion. At this point, discharge does not take place and the molten portion is mechanically taken away by means of the abrasive region 11.

The non-conductive workpiece M is alternately subjected to electrical machining and mechanical machining by means of the rotating grinding wheel 1 having the discharging regions and the abrasive regions alternately arranged thereon.

Although the above embodiments are described in conjunction with grinding wheels having a substantial thickness, this invention is also applicable to a grinding wheel having a thickness of 1 mm or less. Such a thin grinding wheel like a saw may be used to sever workpieces of non-conductive material.

This invention has the following advantages.

(a) The use of a grinding wheel having conductive regions and non-conductive abrasive regions alternately arranged in the direction of rotation and the application of AC or DC voltage allow mechanical grinding and electrolytic/discharge machining to alternately take place on a non-conductive material which could not be machined by conventional electrolytic machining. Since the grinding wheel is rotated at a high speed and AC or DC voltage is applied across the grinding wheel and a non-conductive workpiece, the resulting electric pulses allow electric discharge due to induction to occur, enabling to machine or sever the non-conductive workpiece.

(b) A synergistic effect of electrolytic/discharge machining combined with mechanical grinding is achieved as melting of a material and removal of the molten material are sequentially carried out in an instant.

For example, the grinding rate could be increased about ten times over conventional mechanical grinding when the method of this invention was applied to non-conductive ceramic workpieces using an AC voltage of 5-20 volts at a frequency of 50-500 Hz.

(c) An additional mechanical grinding as required in conventional electrolytic grinding is unnecessary even when severe requirements are imposed on finish dimension and surface accuracy.

(d) A finished surface is smoother than in conventional mechanical grinding.

(e) The grinding wheel used in this invention need not be porous as required in conventional grinding wheels for electrolytic grinding. A commercially available grinding wheel for use in ordinary mechanical grinding may be used which is tough and resistant to chipping so that it may be shaped into a thin disc suitable for cutting operation.

(f) The application of pulse voltage prevents molten material of the workpiece from adhering to the grinding wheel to cause blocking since the grinding wheel is subjected to electrolysis/discharge as well as the workpiece.

What is claimed is:

1. A method for the electrolytic/electric discharge machining of a non-conductive workpiece, comprising
preparing a grinding wheel having conductive regions and non-conductive abrasive regions circumferentially alternately arranged at least on the circumferential edge of the wheel,
placing a non-conductive workpiece beneath the surface of an electrolyte, and
bringing the rotating grinding wheel in contact with said non-conductive workpiece while applying voltage between the conductive regions of said grinding wheel and said non-conductive workpiece.

2. A method according to claim 1 wherein the voltage applied is AC voltage.

3. A method according to claim 1 wherein the voltage applied is DC voltage.

4. A method according to claim 1 wherein said non-conductive abrasive regions are composed of a sintered body of abrasive grains in a bond.

5. A method according to claim 4 wherein said abrasive grain is selected from the group consisting of green carborundum, white alundum, pink alundum, silica, boron nitride, and diamond grains.

6. A method according to claim 1 wherein said conductive regions are composed of a metallic material.

7. A method according to claim 6 wherein said metallic material is an alloy of one or more metals selected from silver, copper and nickel.

8. A method according to claim 1 wherein said grinding wheel comprises a conductive hub, a conductive disc encircling the hub, and an annular bonded abrasive body encircling the disc, wherein metallic strips are embedded in the circumferential edge of said abrasive body to form the conductive regions and electrically connected to the hub through the disc.

9. A method according to claim 1 wherein said non-conductive workpiece is of a material selected from the group consisting of ceramics, glass, quartz, and sapphire.

* * * * *

UNITED STATES PATENT AND TRADEMARK OFFICE
CERTIFICATE OF CORRECTION

PATENT NO.  : 4,448,656
DATED       : May 15, 1984
INVENTOR(S) : AKIO KUROMATSU

It is certified that error appears in the above-identified patent and that said Letters Patent is hereby corrected as shown below:

On the cover page, Item [73], change "Kawagawa" to --- Kanagawa ---.

Signed and Sealed this

Eleventh Day of December 1984

[SEAL]

Attest:

GERALD J. MOSSINGHOFF

*Attesting Officer*   *Commissioner of Patents and Trademarks*